(12) United States Patent
Sassenrath et al.

(10) Patent No.: US 11,846,225 B2
(45) Date of Patent: Dec. 19, 2023

(54) VALVE DEVICE FOR AN INTERNAL COMBUSTION ENGINE (71) Applicant: PIERBURG GMBH, Neuss (DE)

(72) Inventors: Kai Sassenrath, Grevenbroich (DE); Halim Celik, Huerth (DE); Andreas Wehnemann, Neuss (DE); Berthold Herrmann, Neuss (DE)

(73) Assignee: PIERBURG GMBH, Neuss (DE)

( * ) Notice: Subject to any disclaimer, the term of this patent is extended or adjusted under 35 U.S.C. 154(b) by 43 days.

(21) Appl. No.: 17/619,257

(22) PCT Filed: Jun. 17, 2020

(86) PCT No.: PCT/EP2020/066789
§ 371 (c)(1),
(2) Date: Dec. 15, 2021

(87) PCT Pub. No.: WO2020/254422
PCT Pub. Date: Dec. 24, 2020

(65) Prior Publication Data
US 2022/0282656 A1 Sep. 8, 2022

(30) Foreign Application Priority Data
Jun. 18, 2019 (DE) ...................... 10 2019 116 509.1

(51) Int. Cl.
F01N 3/22 (2006.01)
F16K 15/18 (2006.01)
F16K 31/126 (2006.01)

(52) U.S. Cl.
CPC ............ *F01N 3/227* (2013.01); *F16K 15/182* (2021.08); *F16K 31/1262* (2013.01); *F16K 31/1268* (2013.01)

(58) Field of Classification Search
CPC ............. F16K 31/1262; F16K 31/1268; F16K 15/182; F16K 15/1825; F01N 3/227
See application file for complete search history.

(56) References Cited

U.S. PATENT DOCUMENTS 5,203,872 A 4/1993 Naffziger
5,377,954 A * 1/1995 Adams .................. F16K 1/2266
251/363

(Continued)

FOREIGN PATENT DOCUMENTS

DE 102006024728 A1 * 11/2007 ............. F02M 26/50
DE 10 2007 000 462 A1 4/2008

(Continued)

OTHER PUBLICATIONS

DE 102016103549 B3, Sassenrath , Translation (Year: 2016).*
DE-102006024728-A1, Celik, Translation (Year: 2006).*
DE-102020116956-B3, Celik Translation (Year: 2020).*

*Primary Examiner* — Daphne M Barry
(74) *Attorney, Agent, or Firm* — Norman B. Thot (57) ABSTRACT A valve device for an internal combustion engine. The valve device includes an actuator which moves a valve rod, a housing with an inlet and an outlet, a valve closing member attached to the valve rod which is lowered onto and lifted off of a first valve seat, a non-return plate which is loaded via a spring force in a direction of a second valve seat, and a sealing lip which is formed on the second valve seat or on the non-return plate. The sealing lip extends from the second valve seat in a direction of the non-return plate or from the non-return plate in a direction of the second valve seat. The sealing lip is formed with a free end which is inclined in a direction of a side on which a higher pressure is applied when the non-return plate rests on the second valve seat.

15 Claims, 3 Drawing Sheets (56) References Cited

U.S. PATENT DOCUMENTS

| | | | |
|---|---|---|---|
| 7,624,755 B2 * | 12/2009 | Benda | F16K 1/443 251/324 |
| 2005/0279956 A1 | 12/2005 | Berger et al. | |
| 2008/0073605 A1 | 3/2008 | Ishigaki et al. | |
| 2015/0377107 A1 | 12/2015 | Fujita et al. | |
| 2021/0189938 A1 * | 6/2021 | Lampl | F01N 3/30 |

FOREIGN PATENT DOCUMENTS

| | | |
|---|---|---|
| DE | 10 2016 103 549 B3 | 3/2017 |
| DE | 102020116956 B3 * | 10/2021 |
| EP | 1 860 315 A2 | 11/2007 |

* cited by examiner

VALVE DEVICE FOR AN INTERNAL COMBUSTION ENGINE

CROSS REFERENCE TO PRIOR APPLICATIONS

This application is a U.S. National Phase application under 35 U.S.C. § 371 of International Application No. PCT/EP2020/066789, filed on Jun. 17, 2020 and which claims benefit to German Patent Application No. 10 2019 116 509.1, filed on Jun. 18, 2019. The International Application was published in German on Dec. 24, 2020 as WO 2020/254422 A1 under PCT Article 21(2).

FIELD

The present invention relates to a valve device for an internal combustion engine with a pneumatically actuated actuator, a housing with an inlet and an outlet, a valve rod which is movable with the actuator, a valve closing member which is attached to the valve rod and which can be lowered onto and lifted off a first valve seat, a non-return plate which is loaded via a spring force in the direction of at least one second valve seat, and at least one flow cross-section which is formed fluidically between the inlet and the outlet and which can be opened and closed by the valve closing member and the non-return plate.

BACKGROUND

Such valve devices are used in secondary air systems or spark ignition particle filter regeneration units of internal combustion engines. Secondary air systems consist of a secondary air pump and a secondary air valve and are a proven system for reducing pollutant emissions during an engine cold start.

A rich mixture is required for a safe cold start of a gasoline engine, i.e., a fuel-air mixture with a fuel surplus. The catalytic converter is not yet at working temperature immediately after a cold start. Large amounts of carbon monoxide (CO) and unburned hydrocarbons (HC) are therefore produced between the cold start and the start of lambda control. In order to reduce CO and HC emissions, oxygen-rich ambient air is extracted downstream of the air filter via the secondary air pump. This so-called secondary air is pumped through the secondary air valve located further downstream in the secondary air tract and then blown into the exhaust manifold directly behind the exhaust valves. The oxygen in the secondary air oxidizes the pollutants carbon monoxide (CO) and hydrocarbons (HC) to carbon dioxide ($CO_2$) and water ($H_2O$). This exothermic afterburning generates thermal energy which additionally heats up the catalytic converter and thus brings it up to operating temperature quicker.

The central component of the secondary air system is the secondary air valve, which has two functions. As a non-return valve, it prevents exhaust gas condensate and pressure peaks occurring in the exhaust duct from entering the secondary air pump and thereby damaging it. As a shut-off valve, it provides that air only enters the exhaust manifold at the desired time.

Various such secondary air valves have previously been described which are actuated pneumatically or electromagnetically. DE 10 2016 103 549 B3, for example, describes such a valve which functions both as a non-return valve and as a shut-off valve. For both functional modes of the valve, the secondary air duct is sealed off from the exhaust duct via, among other things, a valve plate arranged in the valve, the elastomer coating of which serves as a valve seat for the non-return plate and the valve closing member.

The previously described designs have the disadvantage that leakages can occur due to the geometry of the valve seats which are caused, for example, by pressure fluctuations in the exhaust duct. The valve seats in particular have purely axially aligned sealing lips onto which the non-return plates can be placed vertically. If there are fluctuations in exhaust gas pressure, the axially protruding sealing lips can be caused to vibrate so that the contact between the sealing lips and the non-return plate is at least partially interrupted and, as a result, the seal between the secondary air tract and the exhaust tract does not always fully perform its function.

SUMMARY

An aspect of the present invention is to provide a valve device that provides for an efficient sealing even in the event of pressure fluctuations in the exhaust duct system so as to in turn prevent exhaust gases from flowing back into the secondary air duct and thereby prevent damage to the secondary air pump.

In an embodiment, the present invention provides a valve device for an internal combustion engine. The valve device includes a pneumatically actuated actuator, a housing comprising an inlet and an outlet, a valve rod which is configured to be moved by the pneumatically actuated actuator, a valve closing member which is attached to the valve rod and which is configured to be lowered onto and to lifted off of a first valve seat, a non-return plate which is loaded via a spring force in a direction of at least one second valve seat, and at least one sealing lip which is formed on the at least one second valve seat or on the non-return plate. At least one flow-through cross section is formed fluidically between the inlet and the outlet which can be opened and closed by the valve closing member and the non-return plate. The at least one sealing lip is arranged to extend from the at least one second valve seat in a direction of the non-return plate or from the non-return plate in a direction of the at least one second valve seat. The at least one sealing lip is formed with a free end which is inclined in a direction of a side on which a higher pressure is applied when the non-return plate rests on the at least one second valve seat.

BRIEF DESCRIPTION OF THE DRAWINGS

The present invention is described in greater detail below on the basis of embodiments and of the drawings in which.

DETAILED DESCRIPTION

The present invention provides a valve device where at least one sealing lip is formed on the at least one second valve seat or on the non-return plate, which sealing lip extends from the valve seat in the direction of the non-return plate or from the non-return plate in the direction of the valve seat, and which sealing lip is formed with its free end inclined in the direction of a side on which a higher pressure is applied when the non-return plate rests on the second valve seat, the sealing effect between the sealing lip and the non-return plate being improved due to the greater flexibility of the sealing lip. The sealing lip is accordingly inclined towards the side on which the inlet pressure is applied during normal operation of the valve device. The purpose of the non-return plate is to prevent a reverse flow to the inlet during pressure pulsations. The non-return plate then rests on the valve seat, so that the pressure at the actual outlet of the valve is then greater than at the inlet. The inclination of the free end of the sealing lip is thus towards the side at which there is a higher pressure at that moment, that is, towards the outlet. Free end here means the end of the sealing lip which is not fixed to the non-return plate or the valve seat. This means that the existing pressure differences are used to increase the contact pressure of the non-return plate on the valve seat, which increases the tightness.

The sealing lip can, for example, be inclined at an inner circumference and at an outer circumference. This sealing lip geometry results in an improved contact pressure on the non-return plate and thus a better sealing of the valve device by using the existing pressure conditions at the inner and outer circumference of the sealing lip.

In an embodiment of the present invention, an undercut can, for example, be formed on the side of the sealing lip facing the higher pressure when the non-return plate rests on the second valve seat. A sealing lip with such an undercut is easy to manufacture via a corresponding geometry in the shaping tool. Such an undercut also contributes to an improved sealing effect by utilizing the higher exhaust gas pressure compared to the pressure of the secondary air. For a given sealing lip geometry, the higher exhaust gas pressure tends to press the sealing lip both radially inwards and thus also axially in the direction of the non-return plate. The sealing lip is pressed more strongly onto the non-return plate as a result of the load in both directions, resulting in improved sealing of the valve.

An elastically deformable sealing lip is particularly advantageous. The elasticity supports the function of a sealing lip, for example, by providing better contact between the non-return plate and the sealing lip, thereby providing a reliable closing of the valve overall.

The sealing lip can, for example, be made of an elastomer. The above-mentioned advantages of an elastic design are thereby realized. This elastomer also permits a simple manufacture. Many elastomers are also characterized by a high resistance to thermal and chemical stresses.

In an advantageous embodiment of the valve device according to the present invention, a valve plate can, for example, be fixed in the housing. This valve plate has various valve seats, onto each of which different components of the valve device can be placed and from which they can be lifted off again, so that the valve fulfils its function by separating the inlet of the valve from its outlet or creating the connection between the inlet and the outlet. A valve closing member can thereby be placed on and lifted off a first valve seat. The non-return plate can also be loaded against at least one second valve seat having a sealing lip according to the present invention and can be lifted off again therefrom.

The valve device can, for example, comprise a pneumatically actuable spacer element. Via the spacer element, the axial position of which can be controlled via the negative pressure in a control chamber, the non-return plate is lifted off the second valve seat against the spring force when the valve closing member rests on the first valve seat. This provides that the non-return plate does not stick to the second valve seat or freeze to the second valve seat at low temperatures.

In an embodiment of the present invention, the spacer element can, for example, have a diaphragm that axially limits the control chamber of the pneumatically actuated actuator. The spacer element comprises at least one pin on its side facing away from the control chamber. By generating a negative pressure and by restoring an atmospheric pressure in the control chamber, the spacer element and with it at least the one pin can be moved axially in both directions.

The valve plate can, for example, comprise at least one opening into which the at least one pin of the spacer element projects, the pin being movable against the non-return plate. The pin can prevent sticking of the non-return plate to the valve seat due to, for example, ice formation or adhering exhaust gas condensates. When the valve closing member is closed, the at least one pin extends through the at least one opening of the valve plate and creates an axial gap between the valve seat and the non-return plate.

In an embodiment of the present invention, a plurality of openings can, for example, be formed in the valve plate. Each opening here corresponds to a flow cross-section for the secondary air and each downstream end of the openings here corresponds to a respective second valve seat in the valve plate. Since each second valve seat has a sealing lip, the number of openings in the valve plate corresponds to the number of sealing lips. Each opening in the valve plate is surrounded by a respective sealing lip. The advantage of multiple openings is that a greater flow of secondary air is made possible.

In an embodiment of the present invention, a first sealing lip can, for example, be formed radially inside the openings and can, for example, be inclined radially inward, and a second sealing lip can, for example, be formed radially outside the openings in the valve plate and can, for example, be inclined radially outward. Any number of openings can thus be sealed by the two sealing lips and still improve the sealing effect when the non-return plate is supported. Manufacturing is also simplified.

At least two openings can, for example, extend over a circumferential portion of the valve plate, wherein the openings in the valve plate and the studs of the spacer element are uniformly distributed over the respective circumference. The openings can, for example, extend over about 170° so that the outer circumference of the valve plate is connected to the inner circumference of the valve plate only via two webs extending in the circumferential direction over about 10°. The largest possible flow cross-section is thereby provided. The openings in the valve plate and the pins of the spacer element are here each uniformly distributed over the respective circumference. The advantage of the uniform distribution of several openings and pins is, for example, that an axial-translational movement of the non-return plate is provided, and thus a tilting of the non-return plate is prevented, and a uniform flow against the non-return plate is produced.

In an embodiment of the present invention, the valve plate can, for example, have two openings. The spacer element also has three pins which project into the openings of the valve plate. The openings can, for example, be spaced from each other along an imaginary circumference of a circle having the same radius by an angle of 180°, and the pins can, for example, be spaced from each other by an angle of 120°. The above-mentioned, for example, axial-translational movement of the non-return plate can be provided via this arrangement.

In an embodiment of the valve device according to the present invention, the valve plate on which the first and the at least one second valve seat are formed can, for example, be overmolded with an elastomer at least on the side facing the non-return plate, and the sealing lip can, for example, be formed integrally with this elastomer. This elastomer serves as a bearing surface for the valve closing member, and via the one-piece formation of the sealing lip with this elastomer, moreover also for the non-return plate, which can, for example, be made of PTFE. The deformability and frictional properties of the elastomer are of great importance for the reliable closing of the valve. The one-piece design also enables favorable manufacturability.

All second valve seats can, for example, be arranged radially inside the first valve seat. This arrangement allows the valve closing member, which radially surrounds the non-return plate and the second valve seats and which can be actuated via the valve rod directly via the actuator, to close the valve independently of the position of the non-return plate and the total pressure of the secondary air flow.

In an embodiment of the valve device of the present invention, at least one further diaphragm can, for example, be arranged inside the housing in addition to the diaphragms required for controlling the pneumatically actuated actuator. This further diaphragm is attached at its inner circumference to the valve rod and is clamped at its outer circumference between the valve plate and an annular protrusion of the housing extending axially in the direction of the valve plate. The further diaphragm seals the area of the valve rod guide against the exhaust gas and air and any contaminants conveyed therein and thus contributes to maintaining the long-life function of the valve.

A valve device for an internal combustion engine is thus created which provides a reliable sealing via an improved sealing lip geometry. The improved sealing effect is realized by a simple manufacturing and uses for its implementation inherent properties of the valve or the internal combustion engine, such as existing pressure conditions.

An embodiment of a valve device according to the present invention is shown in the drawings and will be described below.

Figure 1:
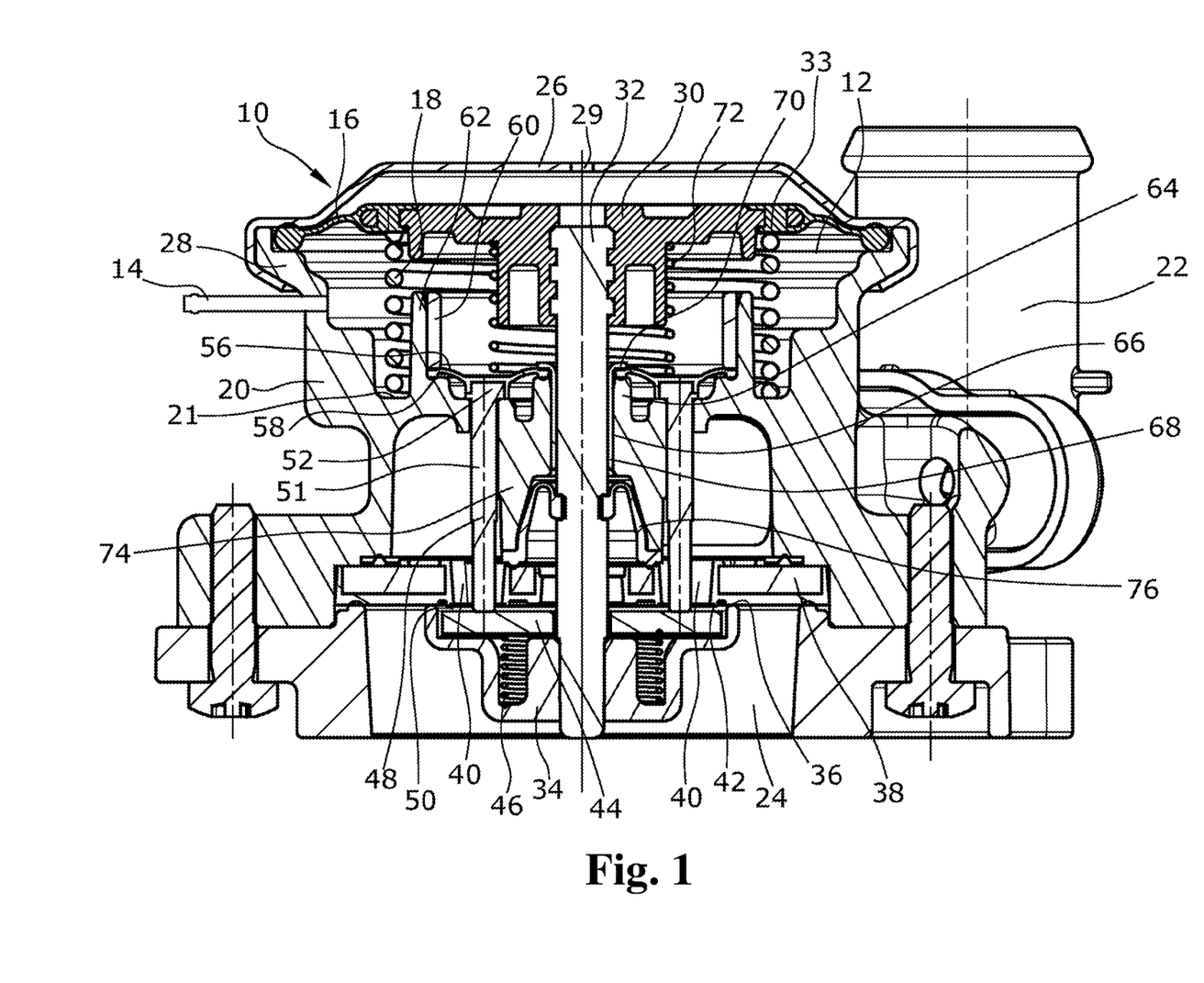
FIG. 1 shows a side view of a valve device according to the present invention in a sectional view.

The valve device according to the present invention comprises a pneumatically actuable actuator 10 with a control chamber 12. Within the control chamber 12, a vacuum can be generated via a connection piece 14, for example, via a vacuum pump, which acts on a first diaphragm 16, which is deformed as a result of the introduced vacuum against a spring force of a first spring 18. The actuator 10 is delimited by a housing 20 which has a first bearing surface 21 for the first spring 18. The housing 20 of the valve device at the same time forms a flow housing comprising an inlet 22 and an outlet 24. On the actuator side, the housing 20 is closed by a cover 26, wherein between the cover 26 and an annular edge 28 of the housing 20, the first diaphragm 16 is clamped at its outer periphery. This separates a space between the cover 26 and the first diaphragm 16 in which atmospheric pressure is present due to a bore 29 formed in the housing 20. The inner circumference of the first diaphragm 16 is molded to a valve rod support 30, to which a valve rod 32 is attached. The first spring 18 is also supported on a mounting portion 33 of the first diaphragm 16 on the valve rod support 30 so that the valve rod 32 is loaded in the direction of the cover 26.

At the end of the valve rod 32 opposite the actuator 10, a valve closing member 34 is secured to cooperate with a first valve seat 36 formed on a valve plate 38. The valve plate 38 is in turn fixed in the housing 20 and comprises two openings 40 serving as flow cross-sections through which the inlet 22 is connectable to the outlet 24 by lifting the valve closing member 34 from the first valve seat 36. These openings 40 extend over an angle of about 170°, as viewed in the circumferential direction of the valve plate 38, and are uniformly distributed over the circumference, so that a web is formed between the openings 40 on both sides, connecting the interior of the valve plate 38 to the exterior.

Two second valve seats 42, which are arranged radially inside the first valve seat 36 and which are configured on the side axially facing the valve closing member 34, are additionally formed on the valve plate 38 and radially surround the openings 40. The two second valve seats 42 each have a sealing lip 43 surrounding the opening 40, onto which a non-return plate 44 can be lowered.

The second valve seat 42 is alternatively formed by a first sealing lip 43 in the radially inner of the openings 40 and a second sealing lip 43 in the radially outer of the openings 40. In both embodiments, the non-return plate 44 is supported on the valve rod 32 and is loaded by a second spring 46 in the direction of the second valve seats 42. This second spring 46 is supported at its opposite axial end on the valve closing member 34 and is radially surrounded by the valve closing member 34, as is the non-return plate 44.

The non-return plate 44 is accordingly loaded by the second spring 46 in the direction of the second valve seats 42 when the valve closing member 34 is closed and thus in the normal position of the actuator 10 in which no vacuum is present in the control chamber 12. Since this is in particular the case when the valve is in the switched-off state of the internal combustion engine, impurities from the exhaust gas or freezing liquids could cause a build-up between the second valve seats 42 and the non-return plate 44 which would impair the operation of the non-return valve during a subsequent cold start. A pneumatically actuable spacer element 48 is therefore additionally mounted in the housing 20, the axial end of which rests against the non-return plate 44 when the valve is switched off or when the valve closing member 34 is closed and lifts the non-return plate 44 away from the second valve seats 42 so that a gap 50 is formed between the second valve seats 42 and the non-return plate 44.

Figure 2:
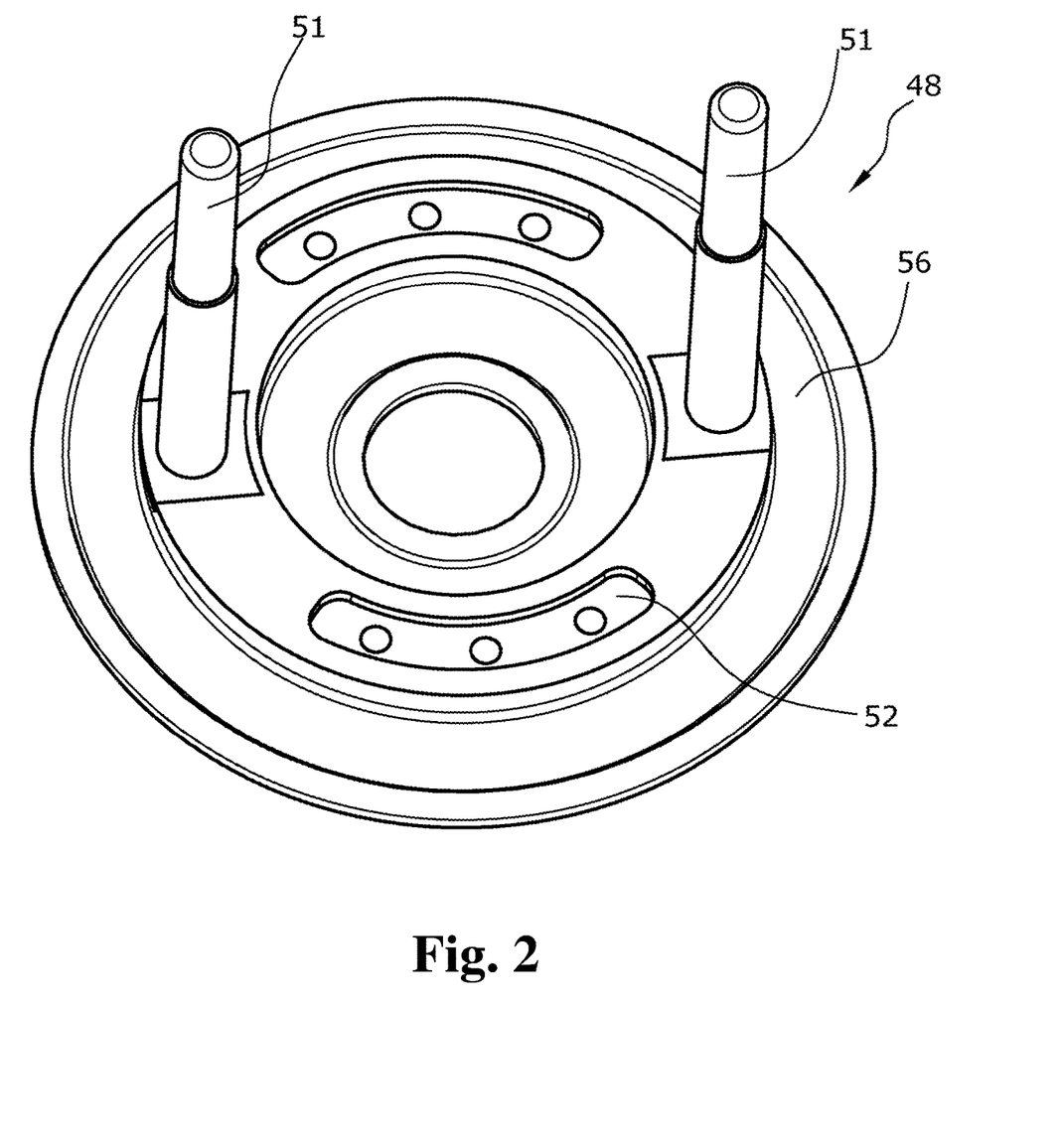
FIG. 2 shows a perspective view of the spacer element with a diaphragm and a pin from FIG. 1.

The spacer element 48 includes pins 51 having ends facing the non-return plate 44 that are convex or rounded outwardly. The rounded end of the pins 51 provide that contact between the pins 51 and the non-return plate 44 occurs over a contact area which is as small as possible. The small contact area further reduces the risk of a possible sticking or freezing with the non-return plate 44.

The spacer element 48 comprises an annular support element 52 from which two pins 51 extend opposite each other in the direction of the non-return plate 44 through the openings 40. Three or four pins 51 could also be used, for example, which are typically distributed uniformly around the circumference of the spacer element 48. A second diaphragm 56, which delimits the control chamber 12 radially inside the first spring 18 in the direction of the valve closing member 34, is attached to the annular support member 52. This second diaphragm 56 is axially clamped at its outer periphery between a third bearing surface 58 in the housing 20 and a mounting ring 60, the mounting ring 60 being press-fitted into a first annular protrusion 62 of the housing 20 extending into the control chamber 12. The second diaphragm 56 is axially clamped at its inner periphery between an axial end of an inner housing portion 64, in which is also formed a receiving bore 66 in which a sliding bushing 68 is arranged for slidably receiving the valve rod 32, and a radially outwardly projecting collar 70 of this sliding bushing 68, which serves as a fastening element.

A third spring 72 is arranged in the control chamber 12, which on one side is supported against the second diaphragm 56 or the annular support element 52, and which on the opposite side rests against the valve rod support 30. This third spring 72 has a greater spring force than the second spring 46 acting on the non-return plate 44, thereby providing that when the second diaphragm 56 is actuated by the third spring 72, the non-return plate 44 is lifted off the second valve seats 42 and is not pressed thereon.

The arrangement of the second diaphragm 56 at the same time provides that no gas or contaminants can enter the control chamber 12 except along the valve rod 32 between the valve rod 32 and the sliding bushing 68. In order to reliably prevent contaminants from entering the control chamber 12, a second annular protrusion 74 extends from the inner housing portion 64 in the direction of the valve plate 38, which annular protrusion 74 ends shortly before the valve plate 38 and between the end of which annular protrusion 74 and the valve plate 38 is clamped the outer circumference of a third diaphragm 76, the inner circumference of which is sealingly attached to the valve rod 32. The guide portion of the valve rod 32 is accordingly completely sealed by the second diaphragm 56 and the third diaphragm 76.

A negative pressure is generated in the control chamber 12 if, in operation, a secondary air flow is to be supplied to the exhaust manifold of the engine. As a result of the negative pressure, the first diaphragm 16 and the second diaphragm 56 are deflected towards each other so that the valve closing member 34 is lifted from the first valve seat 36 and the pins 51 of the spacer element 48 are removed from the non-return plate 44. In this operating condition, i.e., with the valve closing member 34 open and the non-return plate 44 placed on or lifted off the second valve seats 42 depending on the pressure differential, the non-return plate 44 takes up its normal function as a non-return valve. Starting from this condition, if the pressure in the secondary air duct and thus the pressure immediately upstream of the non-return plate 44 is gradually increased by the delivery of secondary air via the secondary air pump, when a certain value is reached, the force exerted on the non-return plate 44 by this pressure exceeds all the forces exerted on the non-return plate 44 axially in the opposite direction, so that the non-return plate 44 is consequently lifted off the second valve seats 42. This causes secondary air to flow from inlet 22 to outlet 24.

Figure 3:
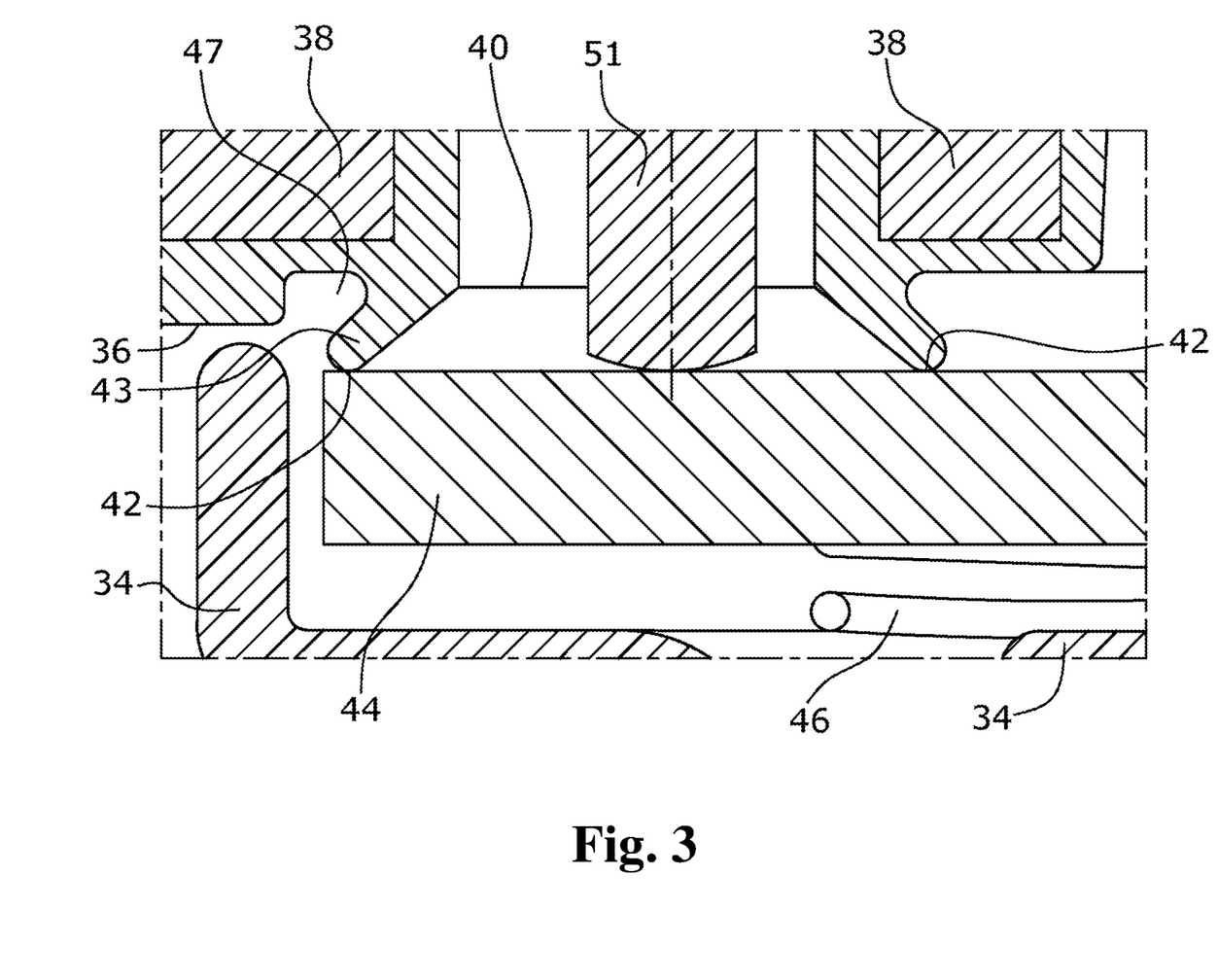
FIG. 3 shows a section of a side view of the valve device according to the present invention of FIG. 1 in a sectional view.

In the event of pressure peaks in the exhaust duct system, the valve device performs its function as a non-return valve, so that a flow from the outlet 24 to the inlet 22 is prevented by the non-return plate 44, since in this state a higher pressure is present at the outlet 24 than at the inlet 22. The non-return plate 44 in this state thus rests on the sealing lips 43 surrounding the openings 40 on the second valve seats 42 so that the flow cross-sections formed by the openings 40 are closed. The sealing lips 43 have both an axial and a radial extension, as can be seen in FIG. 3, whereby radial extension within the meaning of the present application means that a component is formed at a 90° angle to the axial direction pointing away from the openings 40. This thus means that the sealing lip 43 is designed to be inclined towards the non-return plate 44 in comparison with the axial direction, namely pointing away from the openings 40 and thus in the direction of the side on which the higher pressure is applied when the non-return plate 44 rests on the valve seat 42, namely, towards the outlet 24. A lip geometry with an undercut 47 protruding from the valve plate 38 is thus produced on each second valve seat 42 since the sealing lips 43 move away from the openings 40 as the distance from the latter increases.

The orientation and position of the sealing lips 43 takes advantage of the prevailing pressure gradients to increase the seal between the sealing lips 43 and the non-return plate 44 in this condition. This is done because, when the valve closing member 34 is open, when pressure peaks occur in the exhaust duct system and thus at the undercut 47, there is a higher pressure than in the openings 40, which bends the sealing lips 43 in the direction of the non-return plate 44 and thereby presses them against the non-return plate 44 with a higher contact force than in case with prior art sealing lips having a purely axially projecting component.

If no more air is to be delivered, or if the internal combustion engine is turned off, the control chamber 12 is vented and the secondary air pump is turned off so that the spring forces determine the position of the valve rod 32 and the spacer element 48. This results in the valve closing member 34 being moved against and closing the first valve seat 36, and the pins 51 of the spacer element 48 being forced against the non-return plate 44 by the force of the third spring 72, so that the non-return plate 44 is removed from the second valve seats 42. This prevents the exhaust gases present at the outlet 24 and the contaminants present in the exhaust gas, as well as any condensates produced, from accumulating in the abutment area of the non-return plate 44 against the second valve seats 42 and causing the non-return plate 44 to stick, for example, due to ice formation. It is also not possible for these exhaust gases or condensates from the air to enter the area of the valve rod guide since this space is completely sealed by the third diaphragm 76. It follows that the correct operation of the valve device according to the present invention is provided from the start, regardless of the presence of contaminants and temperatures. This also increases the service life of such a valve.

Via the novel sealing lip geometry, a tight closing of the valve device is thus created which also withstands the fluctuating pressure conditions during exhaust gas pulsations. This prevents exhaust gases from flowing back into the secondary air duct, which can damage the secondary air pump under certain circumstances.

It should be clear that the scope of protection of the present invention is not limited to the described embodiment example. Modifications are thus conceivable with respect to the structure of the various parts of the valve device, such as the housing, the spacer element, or the fastening elements. An embodiment without a spacer element is also in particular conceivable. The actuator can also be equipped and supplied with compressed air or negative pressure in a different way than is shown. The number and shape of the openings and the pins can of course also be changed. The sealing lip can also be formed on the non-return plate instead of the valve plate or the valve seat. The free, i.e., non-fixed axial end of the sealing lip is then to be formed with a corresponding inclination. Reference should also be had to the appended claims.

LIST OF REFERENCE NUMERALS

10 Actuator
12 Control chamber
14 Connection piece
16 First diaphragm
18 First spring
20 Housing 21 First bearing surface
22 Inlet
24 Outlet
26 Cover
28 Annular edge
29 Bore
30 Valve rod support
32 Valve rod
33 Mounting portion
34 Valve closing member
36 First valve seat
38 Valve plate
40 Opening(s)
42 Second valve seat(s)
43 Sealing lip(s)/First sealing lip/Second sealing lip
44 Non-return plate
46 Second spring
47 Undercut
48 Spacer element
50 Gap
51 Pin(s)
52 Annular support element
56 Second diaphragm
58 Third bearing surface
60 Mounting ring
62 First annular protrusion
64 Inner housing portion
66 Receiving bore
68 Sliding bushing
70 Projecting collar
72 Third spring
74 Second annular protrusion
76 Third diaphragm

What is claimed is:

1. A valve device for an internal combustion engine, the valve device comprising:
   a pneumatically actuated actuator;
   a housing comprising an inlet and an outlet;
   a valve rod which is configured to be moved by the pneumatically actuated actuator;
   a valve closing member which is attached to the valve rod and which is configured to be lowered onto and to lifted off of a first valve seat;
   a non-return plate which is loaded via a spring force in a direction of at least one second valve seat, at least one flow-through cross section being formed fluidically between the inlet and the outlet which can be opened and closed by the valve closing member and the non-return plate; and
   at least one sealing lip which is formed on the at least one second valve seat or on the non-return plate, the at least one sealing lip being arranged to extend from the at least one second valve seat in a direction of the non-return plate or from the non-return plate in a direction of the at least one second valve seat, the at least one sealing lip being formed with a free end which is inclined in a direction of a side on which a higher pressure is applied when the non-return plate rests on the at least one second valve seat
   wherein,
   an undercut is formed on a side of the at least one sealing lip which faces the side of the higher pressure when the non-return plate rests on the at least one second valve seat.

2. The valve device as recited in claim 1, wherein the at least one sealing lip is further formed to be inclined at an inner circumference and at an outer circumference.

3. The valve device as recited in claim 1, wherein the at least one sealing lip is configured to be elastically deformable.

4. The valve device as recited in claim 3, wherein the at least one sealing lip is made of an elastomer.

5. The valve device as recited in claim 1, further comprising:
   a valve plate which is fixed in the housing, the valve plate comprising the first valve seat and the at least one second valve seat.

6. The valve device as recited in claim 5, wherein,
   the valve plate, on which the first valve seat and the at least one second valve seat are formed, is overmolded with an elastomer at least on a side facing the non-return plate, and
   the at least one sealing lip is formed integrally with the elastomer.

7. The valve device as recited in claim 5, further comprising:
   a spacer element which is configured to be pneumatically actuated and to lift the non-return plate off of the at least one second valve seat in opposition to the spring force when the valve closing member rests on the first valve seat.

8. The valve device as recited in claim 7, wherein,
   the pneumatically actuated actuator comprises a control chamber, and
   the spacer element comprises a diaphragm which axially delimits the control chamber and at least one pin which is formed on a side of the diaphragm which faces away from the control chamber.

9. The valve device as recited in claim 8, wherein,
   the valve plate further comprises at least one opening into which at least one of the at least one pin of the spacer element projects, and
   the at least one pin is configured to move against the non-return plate.

10. The valve device as recited in claim 8, wherein,
    the spacer element comprises three of the at least one pin, and
    the valve plate comprises two of the at least one opening, each of which has a respective one of the at least one pin projecting therein.

11. The valve device as recited in claim 8, wherein the valve plate further comprises a plurality of openings formed therein, each of the plurality of openings being surrounded by the at least one sealing lip.

12. The valve device as recited in claim 11, wherein,
    the at least one sealing lip comprises a first sealing lip and a second sealing lip,
    the first sealing lip is formed radially inside each of the plurality of openings in the valve plate, the first sealing lip being inclined radially inwardly, and
    the second sealing lip is formed radially outside each of the plurality of openings in the valve plate, the second sealing lip being inclined radially outwardly.

13. The valve device as recited in claim 11, wherein,
    at least two of the plurality of openings extend over a circumferential portion of the valve plate, and
    the plurality of openings in the valve plate and the at least one pin of the spacer element are evenly distributed over a respective circumference.

14. The valve device as recited in claim 8, further comprising:
    at least one further diaphragm which is arranged inside the housing,
    wherein, the housing further comprises an annular protrusion which is arranged to extend axially in a direction of the valve plate, and the at least one further diaphragm is fixed at its inner circumference to the valve rod and is clamped at its outer circumference between the valve plate and the annular protrusion of the housing.

15. The valve device as recited in claim 1, wherein each of the at least one second valve seat is/are arranged radially inside the first valve seat.

* * * * *